June 3, 1924.  
D. R. BOWEN ET AL  
1,496,620  
MACHINE AND PROCESS FOR MIXING OR MASTICATING RUBBER AND LIKE MATERIAL  
Original Filed Nov. 28, 1919   6 Sheets-Sheet 1
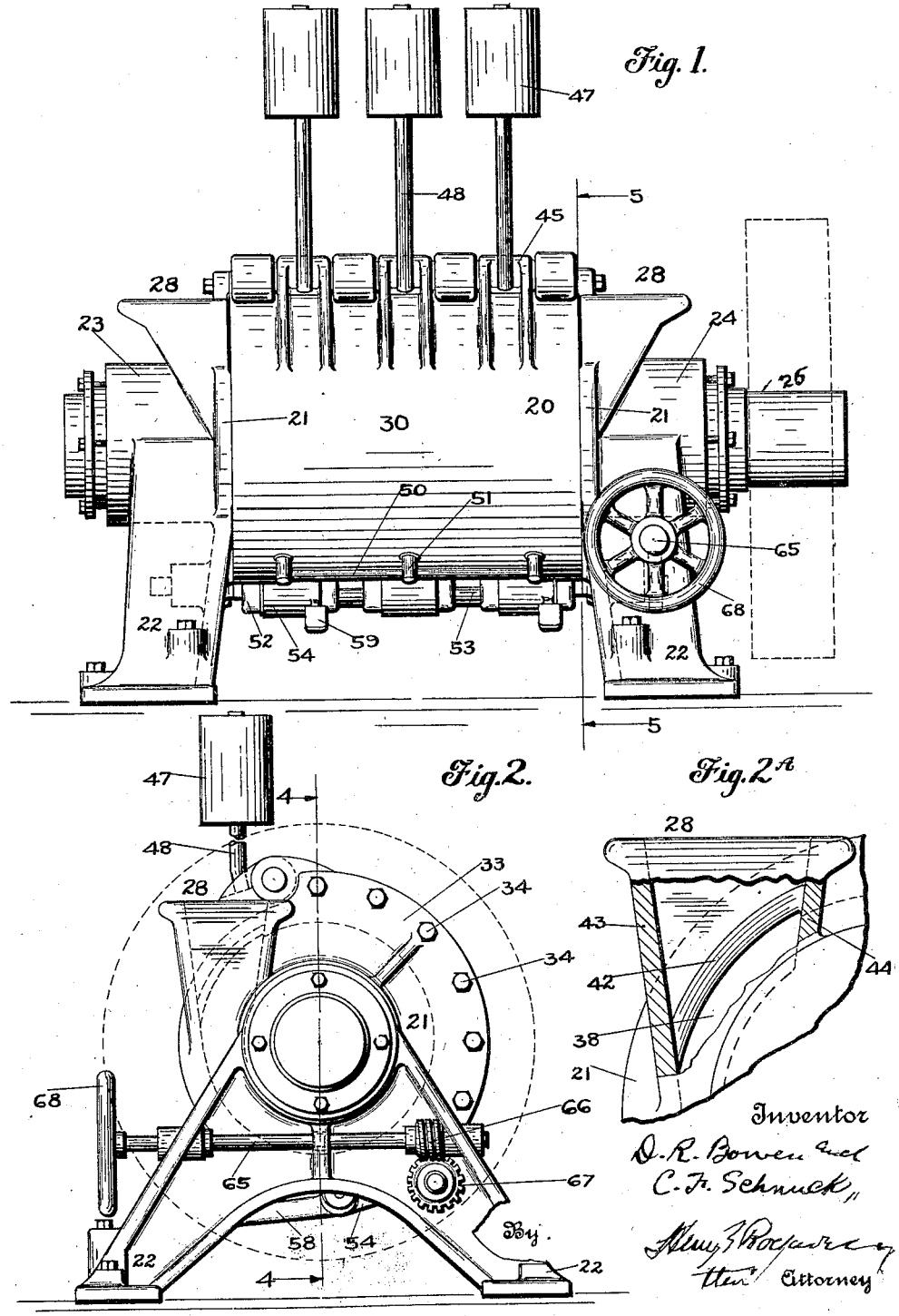

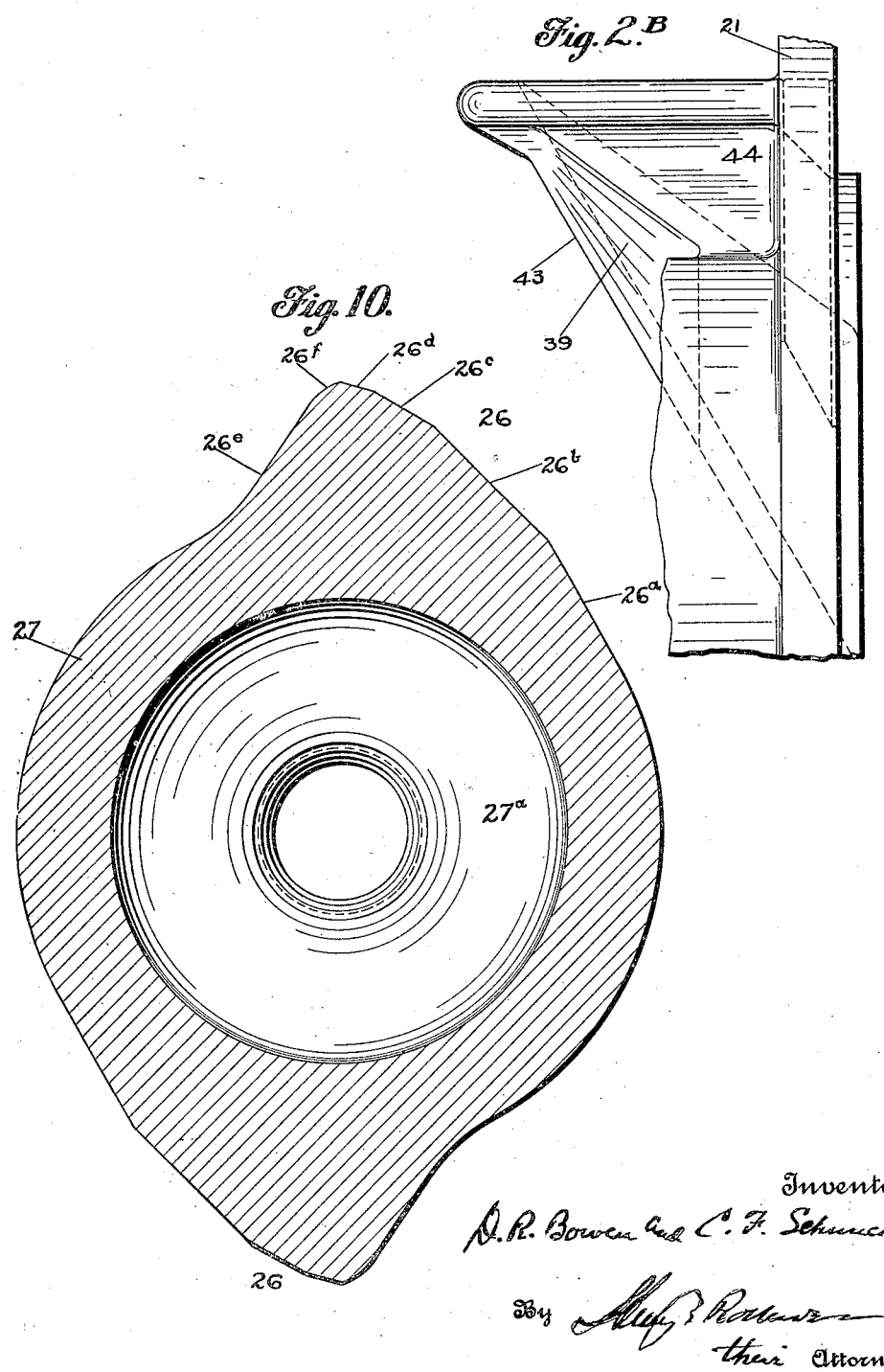

June 3, 1924.
1,496,620
D. R. BOWEN ET AL
MACHINE AND PROCESS FOR MIXING OR MASTICATING RUBBER AND LIKE MATERIAL
Original Filed Nov. 28, 1919    6 Sheets-Sheet 3
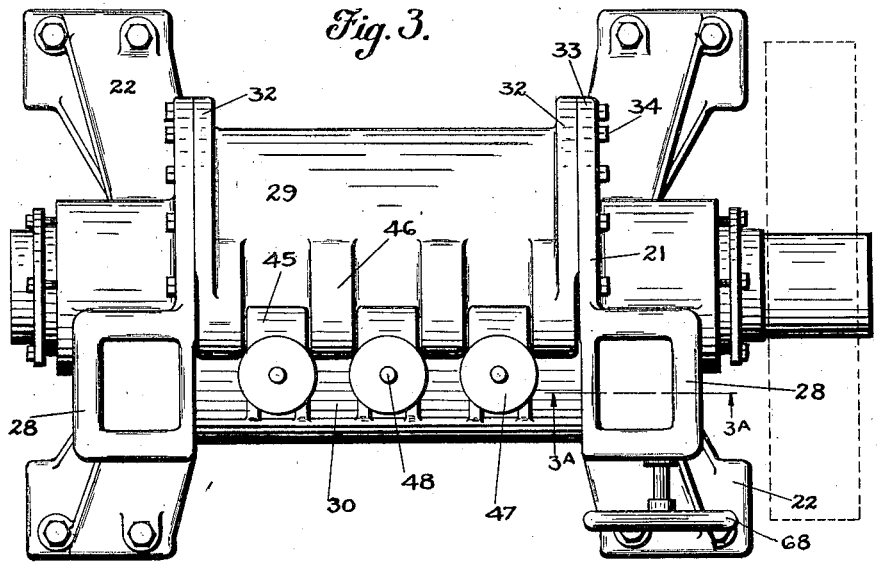
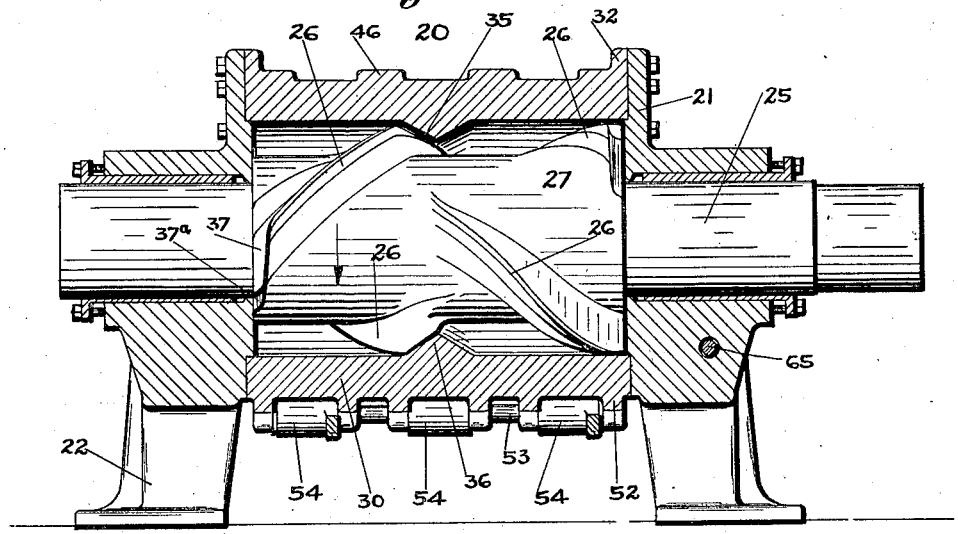

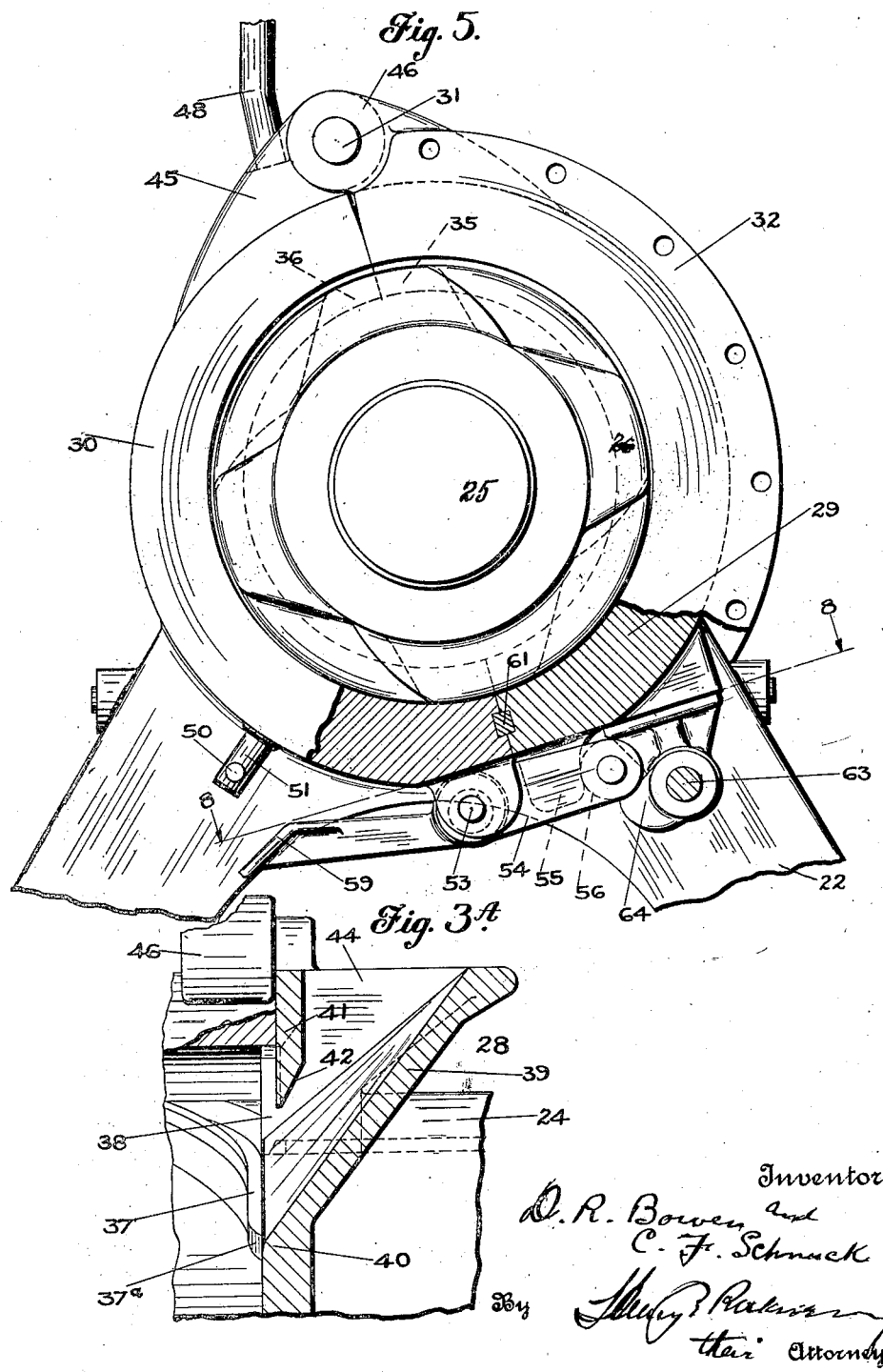

June 3, 1924.  
D. R. BOWEN ET AL  
1,496,620  
MACHINE AND PROCESS FOR MIXING OR MASTICATING RUBBER AND LIKE MATERIAL  
Original Filed Nov. 28, 1919    6 Sheets-Sheet 5

Inventor  
D. R. Bowen and C. F. Schnuck,  
By
their Attorney

June 3, 1924.

D. R. BOWEN ET AL 1,496,620

MACHINE AND PROCESS FOR MIXING OR MASTICATING RUBBER AND LIKE MATERIAL

Original Filed Nov. 28, 1919   6 Sheets-Sheet 6

Inventor
D. R. Bowen and
C. F. Schnuck,
By
their Attorney

Patented June 3, 1924.

1,496,620

UNITED STATES PATENT OFFICE.

DAVID R. BOWEN AND CARL F. SCHNUCK, OF ANSONIA, CONNECTICUT, ASSIGNORS TO FARREL FOUNDRY AND MACHINE COMPANY, OF ANSONIA, CONNECTICUT, A CORPORATION OF CONNECTICUT.

MACHINE AND PROCESS FOR MIXING OR MASTICATING RUBBER AND LIKE MATERIAL.

Application filed November 28, 1919, Serial No. 341,141. Renewed January 10, 1923.

*To all whom it may concern:*

Be it known that we, DAVID R. BOWEN and CARL F. SCHNUCK, both citizens of the United States, and both residing in Ansonia, county of New Haven, State of Connecticut, have invented certain new and useful Improvements in Machines and Processes for Mixing or Masticating Rubber and like Material, of which the following is a full, clear, and exact description.

This invention relates to machines for mixing or masticating rubber and similar material, and it has special reference to machines for compounding rubber, i. e., for producing an intimate mixture of the rubber with sulphur, lamp black, whiting or the like. Usually the rubber is in rather large chunks, and the material to be worked into the same is in a form of a powder.

One of the primary objects of our invention is to provide a machine wherein an intimate and homogeneous mixture of a given amount of material can be effected in a relatively short time.

The machine is also useful in the mastication of rubber or some other substance, alone, that is, for working the mass, with or without the application of heat, until it is rendered plastic and homogeneous.

Another important object of the invention is to provide a machine of the general character described, having improved means whereby the one or more materials to be worked can be charged into the working chamber. By our improvements the charging of the machine is considerably facilitated and its capacity increased.

Another object which we have in view is to furnish a machine of the character set forth having improved means for effecting and controlling the discharge of the treated material.

Still further objects are to provide a machine in which the manipulation of the mechanism and of the materials under treatment is made very convenient for the operator; to furnish an improved construction and arrangement of charging means, working chamber, rotary mixing element, and discharge means; to provide simple, efficient and convenient means providing for the opening of the working chamber for discharging material and the closing and locking of the same when a new batch is to be treated; and to improve the general construction and operation of devices of the class to which the invention relates.

To these and other ends, the invention consists in the novel features and combinations of parts to be hereinafter described and claimed.

In the accompanying drawings:

Fig. 1 is a front elevation of a rubber mixer embodying our improvements;

Fig. 2 is an end elevation of the same.

Fig. 2$^A$ is an enlarged end view, partly broken away, of one of the charging hoppers.

Fig. 2$^B$ is an enlarged fragmentary rear elevation of the hopper shown in Fig. 2$^A$.

Fig. 3 is a top plan view of the machine.

Fig. 3$^A$ is an enlarged section on line 3$^A$—3$^A$ of Fig. 3.

Fig. 4 is a vertical longitudinal section of the machine.

Fig. 5 is an enlarged transverse sectional view of the main part of the machine showing the working chamber locked in the closed position.

Figure 6:
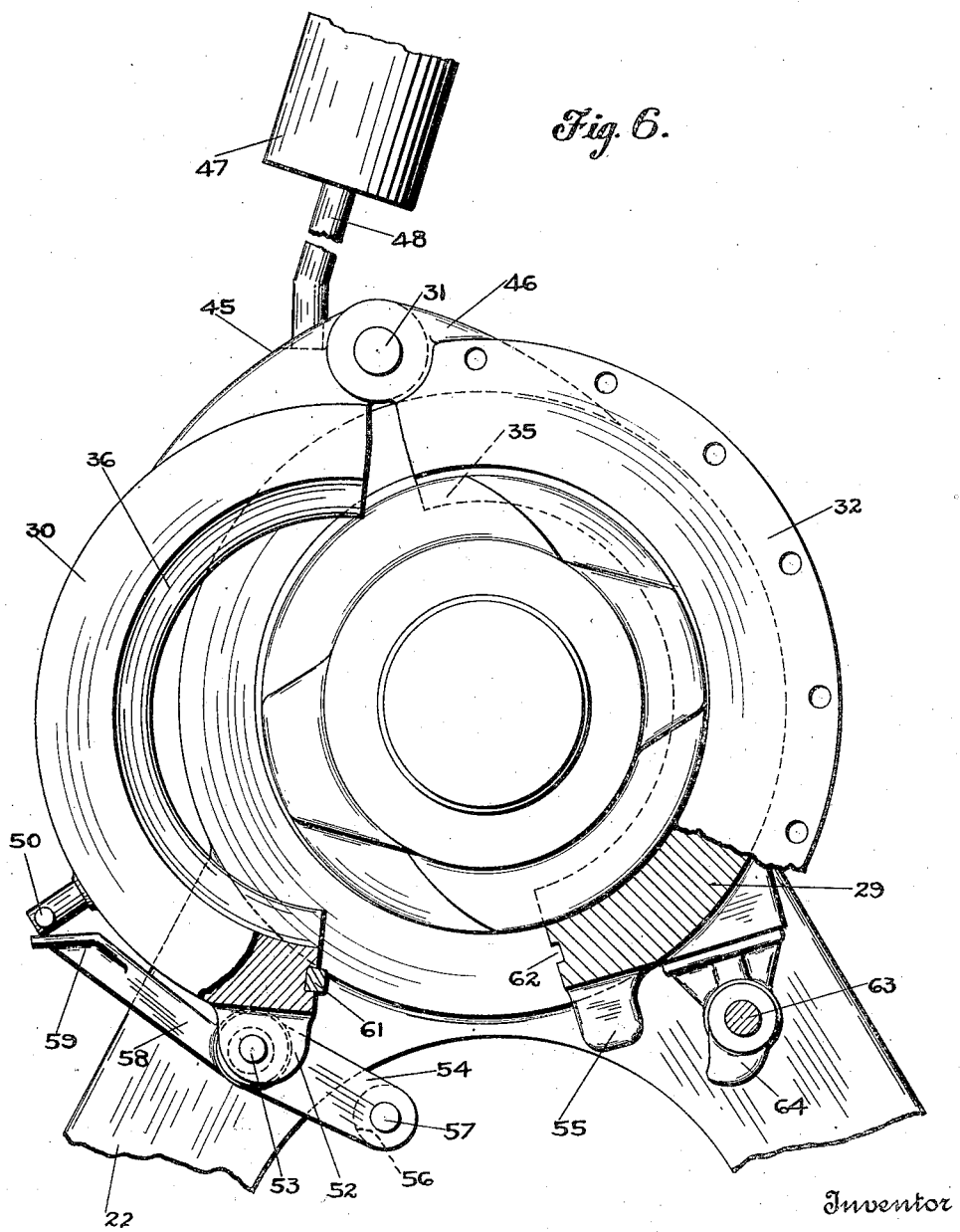

Fig. 6 is a view generally similar to Fig. 5 showing the discharging position.

Figure 7:
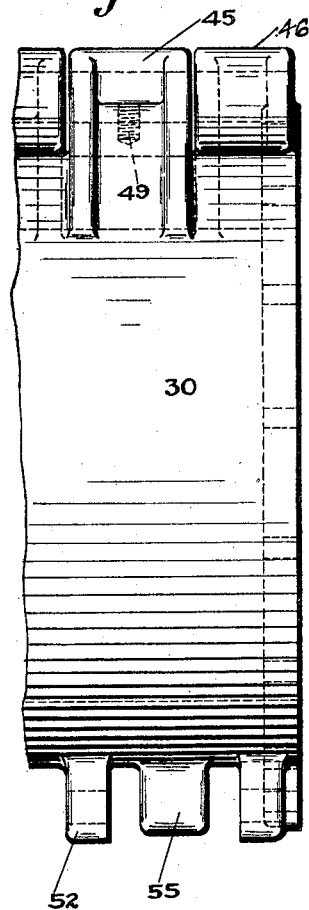

Fig. 7 is a detail elevation of one end portion of the cylindrical part of the casing.

Figure 8:
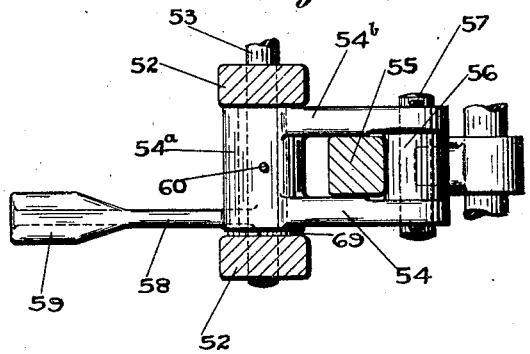

Fig. 8 is a section on line 8—8 of Fig. 5.

Figure 9:
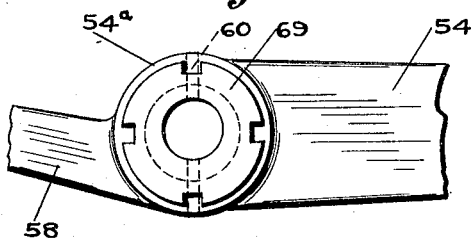

Fig. 9 is a detail of the mounting of one of the latch levers.

Figure 11:
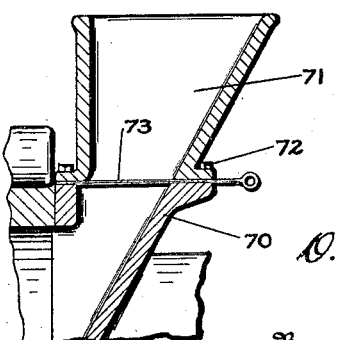

Fig. 10 is an enlarged transverse section through the rotor taken at a point between the middle of the working chamber and one of the ends thereof; and Fig. 11 is a longitudinal vertical section of a charging hopper of somewhat modified form.

We have shown our improvements as applied to a machine of the single cylinder type having a single rotor provided with blades for working the material back and forth in a substantially cylindrical working chamber; but in certain aspects of the invention the latter is applicable to machines of other types.

In the drawing, the working chamber is shown as provided within a substantially cylindrical casing 20 having end frames or heads 21 at the ends. These end frames or heads are bolted to the cylindrical part of the casing and are provided with legs 22 which support the casing from the floor. Journalled in bearings 23, 24 on the respective heads is a shaft 25, provided with blades 26, and constituting a rotary element or rotor for working the material in the working chamber. The blades 26 are so formed and arranged that as the shaft 25 rotates continuously in one direction, the material in the chamber is picked up by the blade or blades in one chamber end, and, while being forcibly pressed and worked against the inner periphery of the chamber, is moved toward and past the center of the chamber into the other end portion thereof, while simultaneously the material in the last named end of the chamber, while being similarly worked against the inner periphery of the chamber, is forced or moved in an approximately reverse direction. In this manner, the material while being worked, is alternately moved back and forth in the chamber. In the particular form shown, two of the blades 26 are provided in each chamber end, such blades being diametrically arranged, as shown in Fig. 10. Furthermore, in the embodiment illustrated, the blades are formed upon the cylindrical surface of a hub portion 27 on the rotor, which is of greater diameter than the bearing portions of the rotor shaft and which extends from one end of the chamber to the other, as shown in Fig. 4.

In the machine under discussion, the material or materials to be treated are charged into the working chamber from hoppers 28 carried by and forming portions of the respective heads 21, the two heads being substantially identical. By means of these hoppers 28, the material can be fed through one or both of the end walls or heads of the working chamber, at the upper part of the chamber. The working chamber is divided longitudinally into sections, in this particular case, one section being hinged to the other at the upper portion of the casing. One section is fixed relatively to the heads, but the other section can be swung on its hinge or pivot in such a manner as to provide for the discharge of the material from the casing at the bottom of the latter, as hereinafter more particularly described. In the embodiment illustrated, the fixed part of the casing is shown at 29 and the movable part at 30. A longitudinal pintle 31, by means of which said sections are hingedly interconnected, is located at the upper part of the casing, as shown in Fig. 5. The respective end portions of the fixed section 29, which in this particular instance is substantially semi-circular in cross-section, are suitably secured to the heads 21, for which purpose section 29 is provided with end flanges 32, and heads 21 are provided with flanges 33, to which the respective flanges 32 are secured by suitable means such as bolts 34.

Intermediate of the ends of the working chamber, the same is provided with a transverse extrusion rib of the general character set forth in our application, Serial No. 191,413, which cooperates with the blades in producing a squeezing or extruding action of the material as it passes from one end portion of the chamber into the other. This extrusion rib is generally V-shaped in cross-section, one portion being provided upon the fixed casing section 29, as indicated at 35, and another portion of said rib, in line with the first, being provided upon a movable or discharge casing section 30, as indicated at 36. In practice, the extrusion rib sections 35, 36 will preferably be cast integral with the respective casing sections, as shown, and the casing of the machine will be water-jacketed to provide for the circulation of a heating or cooling fluid, but this latter feature is not illustrated in the drawings, although in Fig. 10 we have shown the rotor body as provided with an interior space $27^a$ for the circulation of hot or cold water, steam or the like. When the working chamber is closed, as shown in Fig. 5, the extrusion rib sections 35, 36 meet each other at the ends so as to provide in conjunction a continuous annular rib on the inner periphery of the working chamber. Thus the extrusion action referred to is produced at all points in the periphery of the chamber and there is an increase of efficiency over our prior machines wherein a gap or interruption in the rib was provided to permit either the charging or discharging of the machine. It will be understood that the blades 26, at each chamber end, in forcing the material at the center of the chamber to pass through the constricted space provided by the continuous annular rib 35, 36, produce a very efficient working action on the material, which cuts down the time required for the thorough mixing or mastication of the batch.

In the form shown, the working face of each blade is provided with a plurality of flats or facets arranged at different angles, as this form of blade has been found to give superior results in gripping the material against and working it on the inner periphery of the working chamber. While the working face of the blade is generally convex, it has been found advantageous to provide the front face of the blade near the base with relatively wide flats or facets $26^a$, $26^b$, the tip portion of the blade being provided at its working face with narrow flats or facets $26^c$, $26^d$. By preference, also, the facet $26^d$ is joined with the inclined rear face $26^e$ of the blade by a fillet $26^f$. It will be understood that the blades are arranged at an angle on the shaft, as shown in Fig. 4, so as to produce the working of the material towards the center of the chamber, and that the several facets referred to extend substantially longitudinally of each blade. Each blade extends from the end of the chamber substantially to the middle thereof, and the blades in one end of the chamber are aligned in a plane substantially at right angles to a plane passing through the diametrically arranged blades in the other chamber end. It will be understood, however, that we do not limit ourselves to the specific number of blades disclosed.

Each blade is provided at the end adjacent the cylinder head with a cut-off portion or extension 37, which is arranged at an obtuse angle to the main body of the blade and is substantially parallel to the inner face of the corresponding cylinder head and in substantial contact therewith. At the extreme forward edge of the extension 37 is a beveled or chambered portion 37$^a$, which is designed to sever the rubber fed in through the hopper at that end, in case rubber or like material is charged into that end of the machine. The charging opening in the cylinder head, which is shown in Fig. 2$^A$ and Fig. 3$^A$, is in line with the end of the blade, as shown at 38, and the portion 37 at the end of the blade, when opposite the opening 38 wholly or partially cuts off or closes the latter. Each of the hoppers 28 is preferably cast integral with the corresponding head 21 and is located somewhat to one side of the axis of the rotor, at what we may term the front of the machine, as shown in Figs. 2 and 3. The hopper has an inclined end wall 39 and the lower part of the wall 39 defines the charging opening 38 at its lower edge, as shown at 40, such lower or inner edge of the charging opening being in the shape of an arc concentric with the rotor and being located adjacent the periphery of the rotor hub 27. The inner wall of the hopper is indicated at 41 and it will be observed that it is cut away to provide the charging opening 38, the outer edge of which is substantially concentric with the inner edge. Adjacent the outer or upper edge of the charging opening the inner wall of the hopper is beveled, as shown at 42, to facilitate ingress of the material into the working chamber. The hopper is also provided with side walls 43, 44, shown in Fig. 2$^A$, which are preferably inclined somewhat in a downward and inward direction, as shown in Fig. 2$^A$. These side walls 43, 44 are located adjacent the ends of the somewhat elongated arcuate slot which constitutes the charging opening. The upper end edge portion of the movable casing section 30 fits snugly against the inner face of the head 21 when the working chamber is closed, and material fed into the hopper 28 is adapted to pass by gravity through the opening 38 into the end portion of the working chamber into the spaces behind the rotor blades 26. At one point in the revolution of each blade the beveled extremity 37$^a$ cuts off the incoming material, which is arrested in the hopper until the blade passes on to a certain distance, whereupon the material is again released and permitted to move into the chamber at the back of said blade and in front of the next blade, this operation being repeated indefinitely as long as the rotor rotates and there is any material within the hopper. The extension 37 of each blade, having the sharpened extremity, provides for the cutting off of the material in the hopper from that in the chamber at different intervals without the necessity of overcoming any large resistance and the power consumed is thereby decreased and the blades and other parts relieved of undue strain.

The side wall 43 of the hopper is somewhat deeper than the side wall 44 and its inclined lower edge is arranged at a greater angle to the horizontal than is the inclined lower edge of the wall 44; consequently the outer or bottom wall 39 of the hopper which interconnects these two side walls varies in its slant relatively to the rotor axis at different points in a transverse line.

In the particular embodiment shown, the casing sections 29, 30 are semi-cylindrical in shape, and each of them is provided at the top with a series of lugs through which the previously mentioned pintle 31 passes for making the hinged connection. The lugs on casing section 30 are shown at 45, the same being preferably cast integral with the said section and extending upwardly from the upper edge portion thereof. Somewhat similar lugs 46 are cast on the fixed casing section 29 so as to alternate with the lugs 45, and the pintle 31 passes through registering holes in all of the lugs, substantially from one end of the cylinder to the other. In the form shown, there are four lugs on the fixed section and three lugs on the hinged section. It will be observed, also, that in this particular instance, the point of hinging, or in other words, the axis of the pintle, is offset laterally, to a certain extent, relatively to the axis of the rotor, and is placed slightly in front of a vertical plane passing through the rotor axis. The result of this arrangement is that the hinged section 30 tends to hang by gravity in an open position with its lower edge at some distance from the lower edge of section 29. The line of meeting between the lower edges of the sections, when the working chamber is closed, lies somewhat to the rear of a vertical plane passing through the rotor axis, and the means for locking the two sections together during the operation of the machine is associated with the lower edges of the sections, as hereinafter described. When the working chamber is unlocked, the hinged section may be swung forwardly, and as it is desirable at times to have full access to the rotor and the interior of the chamber, we facilitate the upward and forward swinging movement of the hinged section, by the provision of suitable counterweighting means. In the form shown, three counterweights 47 are employed, each of the same being mounted on the upper end of a rod 48. At their lower ends, the rods 48 are screw-threaded and are screwed into threaded sockets 49, associated with the respective lugs 45, as shown more particularly in Fig. 7. The rods 48 are approximately vertical, their lower ends being secured to the section 30 slightly in front of the pintle 31, as shown in Fig. 2. The counterweights are located at the opposite side of pintle 31 from the hinged casing section and overbalance the same to a slight extent so as to hold the hinged casing section normally in the closed position. When the locking mechanism of the casing is released, the casing will automatically open to the extent requisite for the expeditious discharge of the treated material, owing to the pressure of the material against the hinged casing section. We do not limit ourselves, however, to an arrangement wherein the movable casing section is normally held by the counterweights in the closed position, as in some cases it may be advantageous to have the counterweights hold said section normally in a definite open position.

A handle bar 50 extending lengthwise of the hinged section near the lower edge thereof and secured in place by posts 51, affords a good grip for the operator when it is desired to swing the hinged casing section into the fully open position.

The mechanism for holding the lower edges of the casing sections in tight engagement during the mixing operation is preferably constructed as follows: On the lower outer surface of the hinged section 31 near the edge thereof is a longitudinal series of lugs 52 in which is mounted a longitudinal rock shaft 53. This shaft carries a plurality of swinging latch levers 54 that are adapted to cooperate respectively with lugs 55. These lugs 55 are cast on the lower outer surface of the fixed casing section. In the form shown, three latch levers 54 are provided, each being fixedly mounted on shaft 53 between two of the lugs 52; and the lugs 55 are also three in number. The levers 54 have hub portions 54ᵃ on the shaft and substantially parallel arm portions 54ᵇ that extend on both sides of or straddle the corresponding lug 55 on the fixed casing section. The rear surfaces of the lugs 55 are slightly curved and are adapted to be engaged by rollers 56 carried by the respective levers 54. Each of the rollers 56 is mounted to rotate freely on a pin 57 passing through and secured in registering openings in the free end portions of the lever arms 54ᵇ. In the particular form shown, each of the two latch levers 54 at the ends of the machine is provided with an operating extension 58, having a foot piece 59 extending forwardly from the under portion of the machine beneath the handle bar 50 previously described. Each of the levers 54 is fixed to the rock shaft 53 by means of a pin 60, and hence it will be understood that when one of the foot pieces or treadles 59 is raised or lowered, all of the latch levers will be swung down or up, as the case may be. When the parts are in the position shown in Fig. 5, the side members of each lever 54 are located at opposite sides of the corresponding lug 55 and the roller 56 is in snug engagement with the rear face of said lug. The meeting edges of the lower parts of the two casing sections are in snug engagement with each other, and a longitudinal bar 61 set into the edge of one section is tightly wedged into a corresponding groove 62 in the edge of the other section so as to form a snug rabbeted joint which effectively prevents the leakage of any material out of the working chamber during the mixing. The latching mechanism, just described, is held in the latching position, preferably by additional means which constitutes locking mechanism for preventing the disengagement of the rollers from the rear faces of the lugs 55. In the particular form shown, the locking mechanism comprises a longitudinal shaft 63 journalled in the end frames of the machine at the rear portion thereof and slightly at the rear of the fixed lugs 55. Fixed to this shaft 53 are cams 64 corresponding in number to the rollers 56 and aligned with said rollers and adapted to be brought into contact therewith by manually operated means. In the form shown, the manually operated means for shifting the cams 64 comprises a worm shaft 65 arranged transversely of the machine and journalled in the right hand end frame or standard 21 (Figs. 1 and 2). At the rear end of the shaft 65, the same is provided with a worm 66 engaging a worm wheel 67 on one end of the shaft 63. On the front end of the worm shaft 65 is a hand wheel 68, whereby the same may be turned manually from the front of the machine. When the hand wheel is turned in one direction, the cam shaft 63 with the cams 64 thereon is rocked in its bearings to move the cams into engagement with the rollers 56, as shown in Fig. 5; and when the hand wheel is turned in the other direction, the cams 64 are swung down to disengage the rollers, as shown in Fig. 6. When the parts are in the locked position shown in Fig. 5, the latch levers cannot be accidentally disengaged from the fixed lugs owing to the fact that the cam shaft is locked in place through the interengagement of the worm 66 and worm wheel 67. When it is desired to open the casing, the cams 64 are swung downwardly into the position shown in Fig. 6, so as to permit downward swinging movement of the levers 54 to disengage the lugs 55. This downward swinging movement of the levers 54 may take place by gravity, but if the levers should stick they can be readily released by kicking or pushing in an upward direction on one of the lever extensions 59. As soon as the rollers 56 disengage the lugs 55, the hinged casing section swings to the open position shown in Fig. 6, under pressure of the material being treated, which is then discharged through the open lower portion of the casing. When the batch of material has been completely discharged, the working chamber is closed automatically by the counterweight means. One of the latch lever extensions 59 is then pressed downwardly by the foot of the operator for the purpose of engaging the latch levers with their cooperating lugs. The locking mechanism comprising the cams is then actuated in the manner previously described. The cams 64 not only serve as locking means but have the function of increasing the tightness of the joint between the casing sections, owing to the fact that the rollers are forced upwardly with a considerable amount of power (through the hand wheel and worm connections) and, the rear faces of the lugs 55 being curved so as to provide a wedge action, the farther upward the cams 64 are shifted, the tighter will be the engagement between the meeting edges of the sections.

It will be understood, of course, that we do not limit ourselves to any particular number of latch and lock devices, for in some cases only one latch lever and one locking device may be used, although we prefer to employ a plurality of the same. This, however, will depend somewhat on the length of the casing and other considerations. Furthermore, it will be understood that we do not limit ourselves in all aspects of the invention to an arrangement wherein a cam or like device is operative on a latching device, as the means provided for interlocking the two casing sections may be considerably varied without departing from the scope of our invention.

In order to provide for taking up wear on the locking lugs 55 and other parts, we prefer to mount the latch levers 54 adjustably on the rock-shaft 53 in some such manner as that shown in Figs. 8 and 9. In these figures, the hub 54ª of the latch lever has interposed between it and the shaft 53 a bushing 69, the bore of which is eccentric to the outer circumference. This bushing is provided with two or more holes through which the fastening pin 60 may be passed. By this arrangement, the distance from the center of shaft 51 to the center of the roller pin 57 may be varied, in order that the meeting edges of the sections may be tightly engaged by the engagement of the roller with its cooperating lug.

In Fig. 11 we have shown a somewhat modified arrangement of the hopper. In this view, the main portion of the hopper is shown at 70. 71 indicates a hopper extension secured to a flange on top of the main hopper by bolts 72 or the like. Between the two hopper sections, a horizontal slide 73 is interposed, the arrangement being such that it is adapted to be pushed in and drawn out, in order to cut off the upper part of the hopper structure from the lower part and to establish communication between said parts. The advantage of this arrangement is that material may be deposited and kept in the upper hopper portion before it is desired to introduce it into the working chamber of the machine. When the machine is ready for it, the slide 73 is drawn out, so that the material will then slide down into the lower hopper section and into the working chamber. When a sufficient quantity of material has passed into the machine, the slide 73 is pushed in again and this cuts off the working chamber from the atmosphere and prevents dust from being blown out into the room at the same time that it permits an additional charge to be dumped into the upper portion of the hopper while the machine is operating on a previous charge.

The operation of our improved machine will be obvious for the most part from the foregoing description. The rotor shaft is continuously rotated and, the working chamber being closed, the material to be worked is charged into the machine either through one or the other of the hoppers or through both, as conditions may dictate. A feature of considerable importance resides in the fact that the material may be charged into both ends of the working chamber simultaneously if desired, for this speeds up the operation of the machine and increases its capacity. Or, if desired, one hopper may be used for the introduction of one kind of material and the other hopper may be used for the introduction of another kind of material. For example, where the machine is used as a rubber compounding machine, it may be advantageous in some cases to introduce the rubber chunks at one end and to charge in powdered filling material and the like at the other end. The material in each hopper enters by gravity into the chamber when the corresponding charging opening is uncovered so as to pass into the space at the rear of one blade in a position to be worked upon by the next succeeding blade.

When the material has been sufficiently mixed or masticated, the hinged casing section is released and thereupon moves automatically to the discharging position shown in Fig. 6. After all the material has been discharged from the working chamber, the hinged casing section is closed again and locked and the machine is then ready for operation upon another batch of material.

Various changes may be made in the details of construction without departing from the scope of our invention as defined in the claims.

We do not claim broadly herein a machine of the character described having a working chamber, a bladed rotor therein for working material back and forth, said rotor having a plurality of blades in each end of the chamber for working the material against the chamber periphery, as claimed in our co-pending application, Serial No. 423,365, filed November 11, 1920; nor a machine of the character described, having a mixing chamber consisting of a single cylinder and means for working the material back and forth in the cylinder, as claimed in our co-pending application, Serial No. 458,222, filed April 4, 1921; nor a rubber working or similar machine, comprising an elongated hollow single cylinder provided with a substantially continuous circumference and with an end charging opening through which the materials to be mixed move by gravity directly into the chamber, in combination with means for working the material back and forth in said chamber, as claimed in our co-pending application, Serial No. 535,651, filed February 10, 1922.

What we claim is:

1. A rubber mixing machine comprising a working chamber, hoppers at both ends of said chamber, and means for working the material from the ends of the chamber toward the center thereof.

2. The method of mixing or masticating material in a chamber having a rotor therein, which comprises feeding the material to be treated into both ends of the working chamber and then working it back and forth in said chamber.

3. In a machine of the character described, a working chamber, a bladed rotor therein, said chamber being open at both ends for the introduction of material to be treated, said rotor working the material away from the open ends of the chamber.

4. In a machine of the character described, a working chamber, a rotor therein for working the material back and forth, said chamber having an end opening at each end for the introduction of material to be treated.

5. In a machine of the character described, a working chamber, a plurality of stationary hoppers associated therewith and means acting at all times to move the material away from said hoppers.

6. In a machine of the character described, a working chamber, a plurality of stationary hoppers associated therewith, said hoppers being located at the respective ends of the chamber and means in the chamber for working the material away from said hoppers.

7. In a machine of the character described, a working chamber and plurality of stationary hoppers associated therewith, said hoppers located at the respective ends of the chamber and being in communication with the interior of the chamber through openings in the respective end walls.

8. In a machine of the character described, a working chamber, a rotor therein for working the material back and forth, and hoppers at the respective ends of the chamber for the introduction of material.

9. In a machine of the character described, a bladed rotary element, and a chamber containing said element, open at both ends for the introduction of material said bladed element working the material away from the ends of the chamber.

10. In a machine of the character described, a bladed rotary element adapted to work material at one side thereof in one direction and to work material at the other side thereof in an approximately opposite direction, and a chamber containing said element and having a plurality of end charging openings.

11. In a machine of the character described, a bladed rotary element adapted to work material at one side thereof in one direction and to work material at the other side thereof in an approximately opposite direction, and a chamber containing said element and having a plurality of charging openings, said charging openings located at the respective chamber ends.

12. In a machine of the character described, a working chamber, a bladed rotor therein for working the material back and forth, said rotor having a plurality of blades in each end of the chamber for working the material against the inner chamber periphery, said chamber having charging openings at the respective ends.

13. In a machine of the character described, a working chamber, a rotary element therein having a plurality of blades for mashing the material against the inner periphery of the chamber and simultaneously moving it away from the ends of the chamber, said chamber having a plurality of end charging openings.

14. In a machine of the character described, a working chamber, a rotor therein for working the material back and forth, said rotor having a plurality of blades within each end of the chamber, and said chamber having provision for the charging in of the material through one of its end walls.

15. In a machine of the character described, a working chamber having an end opening, a rotor in said chamber having a blade arranged to move the material from the end of the chamber toward the center, said blade provided with a cutting off extension located at an angle to the body portion thereof and cooperating with said opening.

16. A machine of the character described, having relatively movable front and rear casing sections and a fixed hopper at the end.

17. A machine of the character described, having an end head with a charging opening, and curved casing sections abutting said head and arranged at the front and rear of the machine respectively, one of said sections movable relatively to the other for discharging the machine.

18. In a machine of the character described, an end head having a charging opening, a fixed casing section rigid with said head, a hinged casing section movable relatively to said head, and means for locking the hinged casing section to the fixed section.

19. In a machine of the character described, front and rear casing sections of approximately semi-cylindrical form, one of said sections hinged to the other, end heads secured to one of said sections, and means for locking the other section in the closed position.

20. In a machine of the character described, a working chamber divided into front and rear casing sections, heads fixed to one of said sections and provided with charging hoppers, the other section being movably mounted for discharging the machine, and means for locking the movably mounted section in position.

21. In a machine of the character described, a cylindrical casing split into front and rear sections, one of said sections hinged to the other and tending to hang in an open or discharging position.

22. In a machine of the character described, a casing of cylindrical shape diametrically split in a plane almost but not quite vertical, to provide front and rear sections, one of which is fixed and the other movable.

23. In a machine of the character described, a cylindrical casing split approximately diametrically into front and rear sections, one of said sections hinged to the other, and counterweight means normally holding one of said sections in a definite position.

24. In a machine of the character described, fixed and movable casing sections, the fixed section having a lug, the movable section carrying a latch device to cooperate with said lug.

25. A machine of the character described, having a sectional casing and a latch mechanism for holding the casing sections in a closed position.

26. A machine of the character described, having a sectional casing and a latch mechanism for holding the casing sections in a closed position, and a locking mechanism cooperating with said latch mechanism.

27. In a machine of the character described, a casing having relatively movable sections, a latch for securing said sections together, and manually operating mechanism for increasing the tightness of the joint between said sections.

28. In a machine of the character described, a casing having relatively movable sections, a latch for securing said sections together, and manually operating mechanism for increasing the tightness of the joint between said sections, said mechanism cooperating with said latch.

29. In a machine of the character described, fixed and movable casing sections, and a latch lever carried by the movable section, substantially as described.

30. In a machine of the character described, relatively movable sections adapted to meet along their edges to hold the casing closed, and cam means embodying a worm shaft for increasing the tightness of the joint between the sections.

31. In a machine for mixing or masticating rubber or like material, a chamber having hoppers at the respective ends for receiving the material to be treated, and means within the chamber for working portions of the mass against and along the chamber periphery under heavy pressure alternately in opposite directions.

32. In a rubber mixer or like machine, a working chamber having a swinging closure, latch devices in different points in the lengths of said closure for holding it in the closed position, and means cooperating with said latch devices for forcing the closure into tight relation to the adjacent parts.

33. In a rubber mixer or like machine, a working chamber having a swinging closure, a latch device for holding said closure in the closed position, and a cam member cooperating with said latch device.

34. In a machine of the character described, a working cylinder, a bladed rotor therein, and an extrusion rib cooperating with the rotor and extending continuously around the inner periphery of the chamber, the rotor working the material back and forth in the chamber past said rib.

35. In a machine of the character described, a working chamber in the form of a single cylinder, a bladed rotor in said cylinder for working the material back and forth, and an annular continuous extrusion rib intermediate of the ends of the cylinder cooperating with the rotor, said cylinder having provision for charging the same from the end, substantially as described.

36. In a machine of the character described, a working chamber in the form of a single cylinder having front and rear substantially semi-cylindrical sections, one of said sections being hinged to the other for discharging the machine, and the machine having provision whereby it may be charged from the end of the chamber.

37. In a machine of the character described, a working chamber in the form of a single cylinder composed of front and rear sections, one of said sections mounted movably to provide for the discharge of the machine, a rotor in the working chamber for working the material back and forth, said chamber having provision whereby it may be charged from the end, and said front and rear sections of the working chamber being provided with rib sections forming in conjunction a substantially continuous transverse extrusion rib.

38. In a machine of the character described, a working chamber, a rotor therein, a hopper on the chamber open at the top and divided into upper and lower sections.

In witness whereof, we have hereunto set our hands on the 24th day of November, 1919.

DAVID R. BOWEN.
CARL F. SCHNUCK.